April 23, 1957     O. M. GULDJORD     2,789,864
COMBINATION DRINKING FOUNTAIN AND FAUCET
Filed Nov. 29, 1955
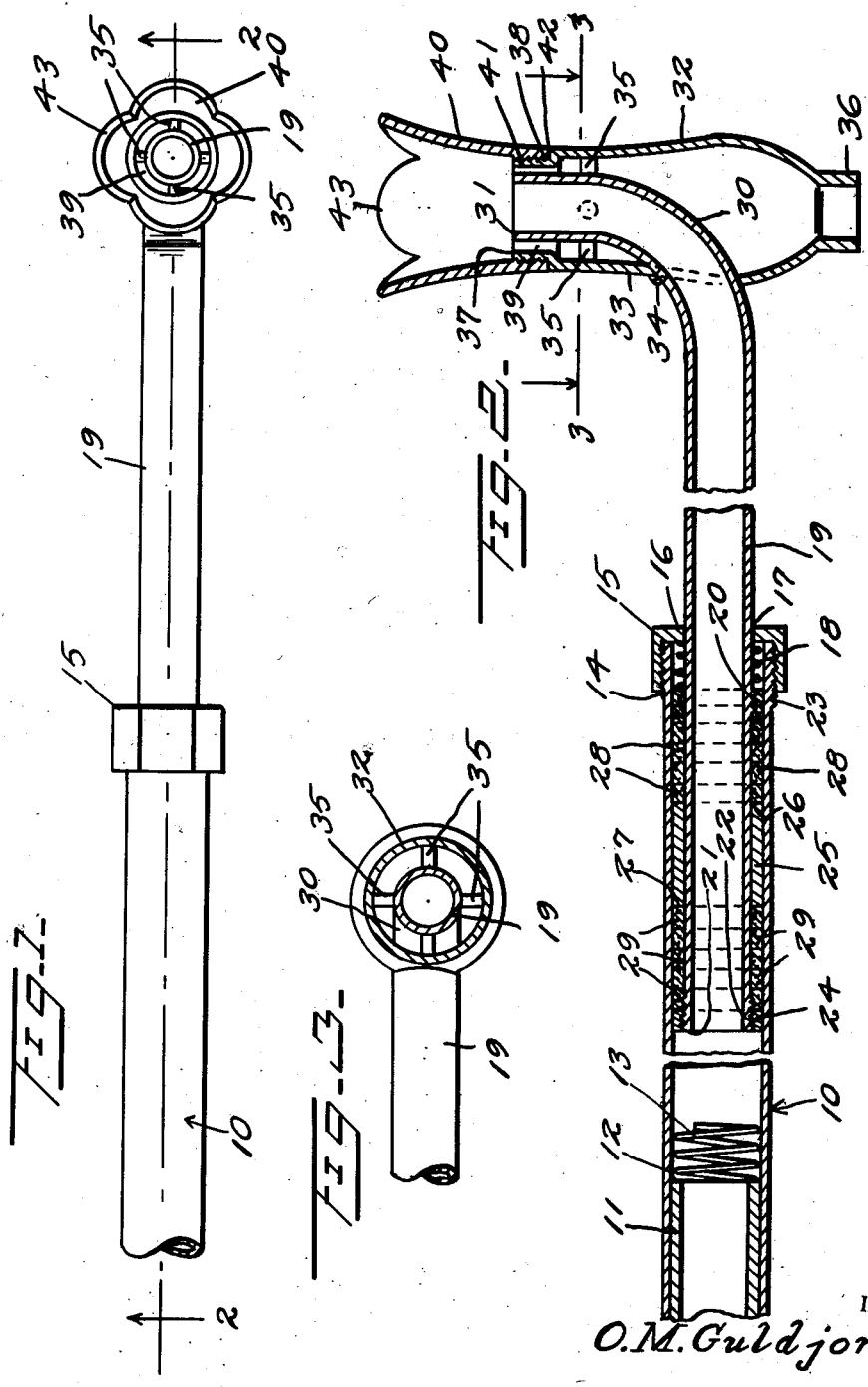
INVENTOR
O. M. Guldjord
BY Kimmel & Crowell
ATTORNEYS United States Patent Office 2,789,864
Patented Apr. 23, 1957

2,789,864

COMBINATION DRINKING FOUNTAIN AND FAUCET

Oscar M. Guldjord, Seattle, Wash.

Application November 29, 1955, Serial No. 549,758

1 Claim. (Cl. 299—10)

The present invention relates to combination drinking fountains and faucets and, more particularly, to such constructions which can be adjusted from a faucet position to a drinking fountain position.

The primary object of the invention is to provide a combination drinking fountain and faucet.

The drinking fountain is provided with an internal waste water drain.

Another object of the invention is to provide a combination drinking fountain and faucet in which the drinking fountain is protected from direct mouth contact by the user, thus avoiding exposure to communicable diseases.

A further object of the invention is to provide a combination drinking fountain and faucet which can be horizontally telescopically adjusted and which can be inverted from a drinking fountain position to a faucet position.

A still further object of the invention is to provide a device of the class described above in which a fountain protective device is detachably secured to the fountain so that it might be removed during use of the device as a faucet.

And yet another object of the invention is to provide a combination drinking fountain and faucet which will be inexpensive to manufacture, simple to use and readily maintained in operative condition.

Other objects and advantages will become apparent in the following specification when considered in the light of the attached drawings, in which:

Figure 1 is a top plan view of the invention with the device illustrated in drinking fountain position;

Figure 2 is an enlarged fragmentary longitudinal cross section taken along the line 2—2 of Figure 1, looking in the direction of the arrows; and, Figure 3 is a fragmentary horizontal cross section taken along the line 3—3 of Figure 2, looking in the direction of the arrows.

Referring now to the drawings in detail wherein like reference numerals indicate like parts throughout the several figures, the reference numeral 10 indicates generally a tubular pipe extending from a faucet mounting (not shown) which may be either of a swivel or stationary construction. The pipe 10 is provided with a tubular shoulder member 11 positioned internally thereof and having an outer end 12. A coil spring 13 is mounted axially in the pipe 10 in engagement with the end 12 of the tubular shoulder 11 for purposes to be described. The outer end of the tubular pipe 10 is screw threaded at 14 and a nut 15 is engaged over the threaded portion 14 of the pipe 10. The nut 15 is provided with a radially extending internal flange 16 having a bore 17 axially extending through a flange 16 extending internally beyond the inner surface of the pipe 10. A coil spring 18 is positioned within the pipe 10 and the outer end thereof in engagement with the flange 16. A second pipe 19 is telescopically mounted within the pipe 10 and extends through the bore 17 of the nut 15. The pipe 19 is screw threaded at 20 at a point spaced apart from the inner end 21 thereof. The pipe 19 is screw threaded at 22 adjacent the inner end 21 on the external face of the pipe 19. A collar 23 is threaded onto the threads 20 of the pipe 19 and engages the inner face of the pipe 10. A collar 24 is mounted on the threads 22 and likewise engages the inner face of the pipe 10. A tubular spacer 25 is positioned centrally between the collars 23 and 24 and between the pipes 10 and 19 as illustrated in Figure 2. The spacer 25 has opposed parallel end walls 26 and 27 extending perpendicularly to the axis of the spacer 25. A plurality of resilient packing rings 28 are positioned between the pipes 10 and 19 and between the collar 23 and the end wall 26 of the spacer 25. A plurality of resilient packing members 29 are positioned between the pipes 10 and 19 and between the collar 24 and the end wall 27 of the spacer 25. Adjustment of the collars 23 and 24 toward the spacer 25 being adapted to provide a sealed relation between the pipes 10 and 19. However, it should be noted that the pipe 19 can be rotated and reciprocated within the pipe 10 without breaking the seal. The springs 13 and 18 provide resilient stop members for the pipe 19 at each end of its reciprocation in the pipe 10.

The outer end of the pipe 19 is curved as at 30 terminating in an end 31, the axis of the end 31 of the pipe 19 lying perpendicularly to the axis of the inner end 21 thereof. A bulbous hollow cover 32 is positioned over the outer end of the pipe 19 with the curved portion 30 of the pipe 19 passing through the side wall 33 of the bulbous cover 32 at 34. The bulbous cover 32 is welded or otherwise secured to the pipe 19 at the point 34. A plurality of spacer lugs 35 are positioned between the outer wall of the pipe 19 and the inner surface of the side wall 33 of the bulbous cover 32 to maintain the bulbous cover 32 in spaced apart relation with respect to the end 31 of the pipe 19. The lower end of the bulbous member 32 converges and is provided with an outlet neck 36. The upper end of the bulbous member 32 is inwardly offset as at 37 and provided with external screw threads 38. The end 31 of the pipe 19 is spaced apart from the inwardly offset portion 37 of the bulbous member 32 to provide an annular passage 39 around the pipe 19. A further protecting shield 40 is internally screw threaded at 41 and mounted on the offset end portion 37 of the bulbous member with the screw threads 41 cooperating with the screw threads 38 thereof. The shield 40 is flared outwardly from its end 42 connected with the bulbous member 32 and is provided with tulip-like scallops 43. The shield 40 is detachable from the bulbous cover 32 to permit the end 31 of the pipe 19 to be brought directly in contact with a container being filled when the device is being used as a faucet.

In the use and operation of the invention the bulbous cover 32 and the end 31 of the pipe 19 are placed in the position as illustrated in Figure 2, with the pipe 19 positioned within the pipe 10 as desired. Water from the water system (not shown) is admitted to the pipe 10 and hence to the pipe 19 and flows upwardly out of the end 31 of the pipe 19 to a point above the scalloped end 43 of the shield 40. The user of the device may drink therefrom in the conventional manner of drinking from a fountain with the excess water passing downwardly through the passage 39 and out the outlet neck 36 of the bulbous cover 32. Obviously, the shield 40 will prevent direct contact of the lips of the user with the end 31 of the pipe 19. To use the device as a faucet the pipe 19 is rotated about its own axis within the pipe 10 180° moving the end 31 of the pipe 19 from a point extending upwardly from the pipe 19 to a point extending downwardly from the pipe 19. The end 31 of the pipe 19 can also be adjusted horizontally with respect to the pipe 10 with the springs 13 and 18 acting to absorb any shock at the completion of the horizontal movement of the pipe 19. Should it be desired to use the faucet characteristic of the device for filling objects which must be held closely to the end 31 of the pipe 19, then the shield 40 is removed to expose the end 31 of the pipe 19 for this purpose.

Having thus described the preferred embodiments of the invention, it should be understood that numerous modifications and structural adaptations may be resorted to without departing from the scope of the appended claim.

What is claimed is:

A combination drinking fountain and faucet comprising a pipe, a second pipe having a right angularly disposed portion, said second pipe having an end opposite said right angularly disposed portion rotatably and telescopically mounted in said first pipe, means sealing said first pipe to said second pipe, said second pipe having the right angularly disposed portion terminating in an open outlet, a bulbous cover encompassing said right angularly disposed portion and having one end thereof concentric to and spaced apart from the open outlet end of said second pipe, an outlet neck formed on said bulbous cover on the end of said cover opposite the open outlet end of said second pipe and a shield detachably secured to said bulbous cover on the end opposite said outlet neck with said shield extending substantially beyond the terminal end of said right angularly disposed portion, said shield and said bulbous cover with said outlet neck forming a waste water collector and drain for said drinking fountain.

References Cited in the file of this patent
UNITED STATES PATENTS

| | | |
|---|---|---|
| 1,091,552 | Westerberg | Mar. 31, 1914 |
| 1,127,683 | Schwartz | Feb. 9, 1915 |
| 1,366,150 | Askin | Jan. 18, 1921 |
| 2,570,635 | Beyer | Oct. 9, 1951 |